United States Patent [19]

Ford et al.

[11] 4,412,648

[45] Nov. 1, 1983

[54] CONTROL VALVE ASSEMBLY FOR STEAM RADIATORS

[75] Inventors: Thomas H. Ford, Tarrytown, N.Y.; Arend Sasserath, Monchen-Gladbach, Fed. Rep. of Germany

[73] Assignees: Ammark Corporation, Fair Lawn, N.J.; Hans Sasserath & Co. KG, Fed. Rep. of Germany; a part interest

[21] Appl. No.: 364,427

[22] Filed: Apr. 1, 1982

[51] Int. Cl.³ .............................................. G05D 23/12
[52] U.S. Cl. ....................................... 236/42; 137/599
[58] Field of Search .................. 236/42; 137/183, 599, 137/854

[56] References Cited

U.S. PATENT DOCUMENTS

| | | | |
|---|---|---|---|
| 1,849,689 | 3/1932 | Rode | 137/599 |
| 2,087,690 | 7/1937 | Kohut | 137/599 X |
| 2,096,989 | 10/1937 | Kohut | 137/599 X |
| 2,274,436 | 2/1942 | Spence | 137/599 X |
| 3,633,613 | 1/1972 | Julow | 137/854 X |
| 4,214,698 | 7/1980 | Josefsson | 137/183 X |

OTHER PUBLICATIONS

"Automatic Control Valve Fulfills Strong Need" by T. H. Ford, Contractor, Oct. 1, 1982.

*Primary Examiner*—William E. Tapolcai
*Attorney, Agent, or Firm*—Samuelson & Jacob

[57] ABSTRACT

A control valve assembly for use in a one-pipe steam heating system in which the passage of steam to each radiator in the system and the return of condensate from each radiator is controlled by individual valve assemblies at each radiator, the valve assemblies being temperature responsive for the regulation of heat provided at each radiator location. Each valve assembly includes a temperature-responsive valve arrangement for controlling the admission of steam to the radiator through a supply pipe and a pressure-responsive valve arrangement for enabling the return of condensate through the same pipe, the entire assembly being compatible with existing fittings for the ready replacement of conventional radiator valves.

8 Claims, 3 Drawing Figures

CONTROL VALVE ASSEMBLY FOR STEAM RADIATORS

The present invention relates generally to controls for steam heating systems and pertains, more specifically, to a control valve assembly which is employed readily in existing one-pipe steam heating systems for supplying steam and withdrawing condensate from a radiator in the system to enable individual thermostatic control of that radiator.

Steam heating systems were used extensively in the past to heat domestic as well as commercial and industrial buildings. Many of these steam heating systems still are in use today, even though the system basically lack the efficiency and flexibility of more modern heating arrangements. While there have been various proposals for the modernization of existing steam heating systems to enable the systems to operate more economically and with more versatility, the modifications themselves often have been so extensive as to render them impractical, especially for individual users. This has been true especially in one-pipe steam heating systems where control flexibility is severely limited.

It is an object of the present invention to provide a control valve assembly for use in a one-pipe steam heating system, whether new or existing, the control valve assembly being capable of ready installation in place of a conventional radiator valve to enable individual thermostatic operation of that particular radiator.

Another object of the invention is to provide a control valve assembly for a radiator in a one-pipe steam heating system, which control valve assembly operates in response to the temperature of the ambient atmosphere for which that radiator is responsible to enable more flexibility as well as increased efficiency in the heating system, thereby resulting in the conservation of energy.

Another object of the invention is to provide a control valve assembly of the type described and which accomplishes a better system balance in a one-pipe steam heating system so as to deliver more evenly-distributed temperatures throughout the system.

Still another object of the invention is to provide a control valve assembly of the type described and which is economical to manufacture and easy to install within existing heating systems so as to offer relatively inexpensive modernization without a major disruption of the existing system.

Yet another object of the invention is to provide a control valve assembly of the type described and which is compact in its design and construction, requiring a minimum amount of space so as to fit easily without existing installations.

A further object of the invention is to provide a control valve assembly of the type described and which is simple to operate.

A still further object of the invention is to provide a control valve assembly of the type described and which is reliable in operation and will provide exemplary service over a relatively long service life.

The above objects, as well as still further objects and advantages, are attained by the present invention which may be described briefly as a control valve assembly for use in a one-pipe steam heating system in which incoming steam and outgoing condensate are carried to and from a radiator by a single pipe connected to the radiator through the valve assembly, for supplying heat to the ambient atmosphere at the radiator, the valve assembly comprising: a valve body; first and second ports in the valve body; a conduit within the valve body, the conduit interconnecting the first and second ports; means for enabling connection of the first port to the single pipe; means for enabling connection of the second port to the radiator; valve means in the valve body between the first and second ports, the valve means including a first valve passage interconnecting the first and second ports; a first valve member movable to open and close the first valve passage; temperature-responsive means coupled to the first valve member for moving the first valve member in response to the temperature of the ambient atmosphere at the radiator for controlling the passage of incoming steam from the single pipe to the radiator; a second valve passage interconnecting the first and second ports; and a second valve member movable in response to pressure differences between the first and second ports to preclude the passage of incoming steam through the second valve passage and to enable the passage of outgoing condensate from the radiator to the single pipe.

The invention will be understood more fully, while still further objects and advantages will become apparent, in the following detailed description of a preferred embodiment illustrated in the accompanying drawing, in which.

Figure 1:
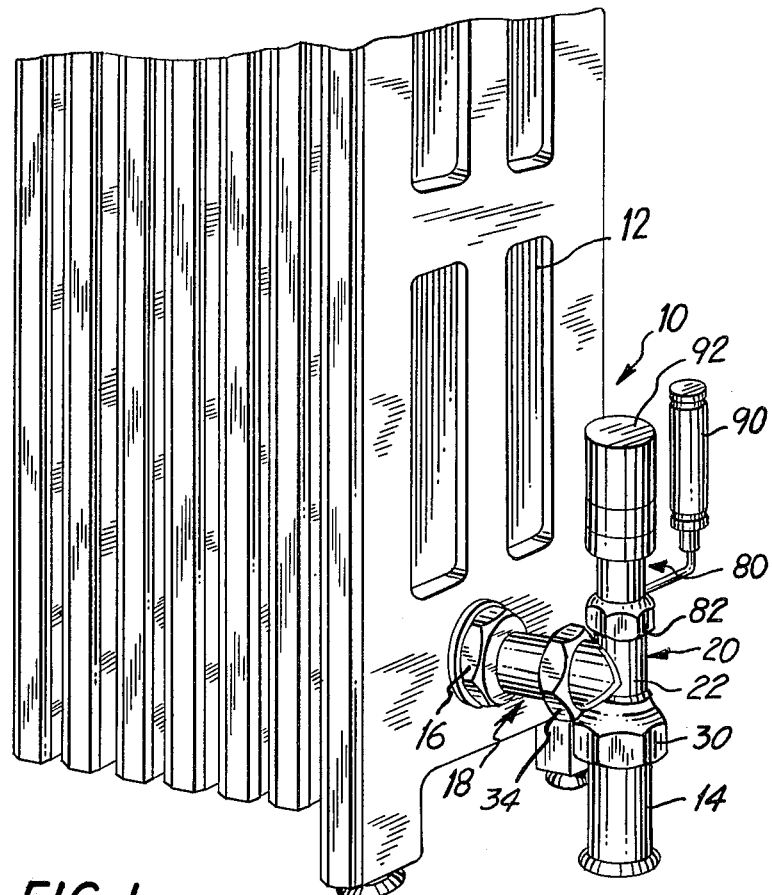
FIG. 1 is a pictorial view of a control valve constructed in accordance with the invention and installed in a one-pipe steam heating system.

Referring now to the drawing, and especially to FIG. 1 thereof, a steam heating system 10 is seen to include a radiator 12 which is connected to a single pipe 14 through which the radiator 12 is supplied with steam and through which condensate is returned. Such a steam heating system is known as a "one-pipe" system. Radiator 12 includes an integral internally threaded boss 16 into which there is threaded a fitting 18 for coupling the radiator 12 to pipe 14 through a control valve which, in this instance, is control valve assembly 20 constructed in accordance with the invention.

Figure 2:
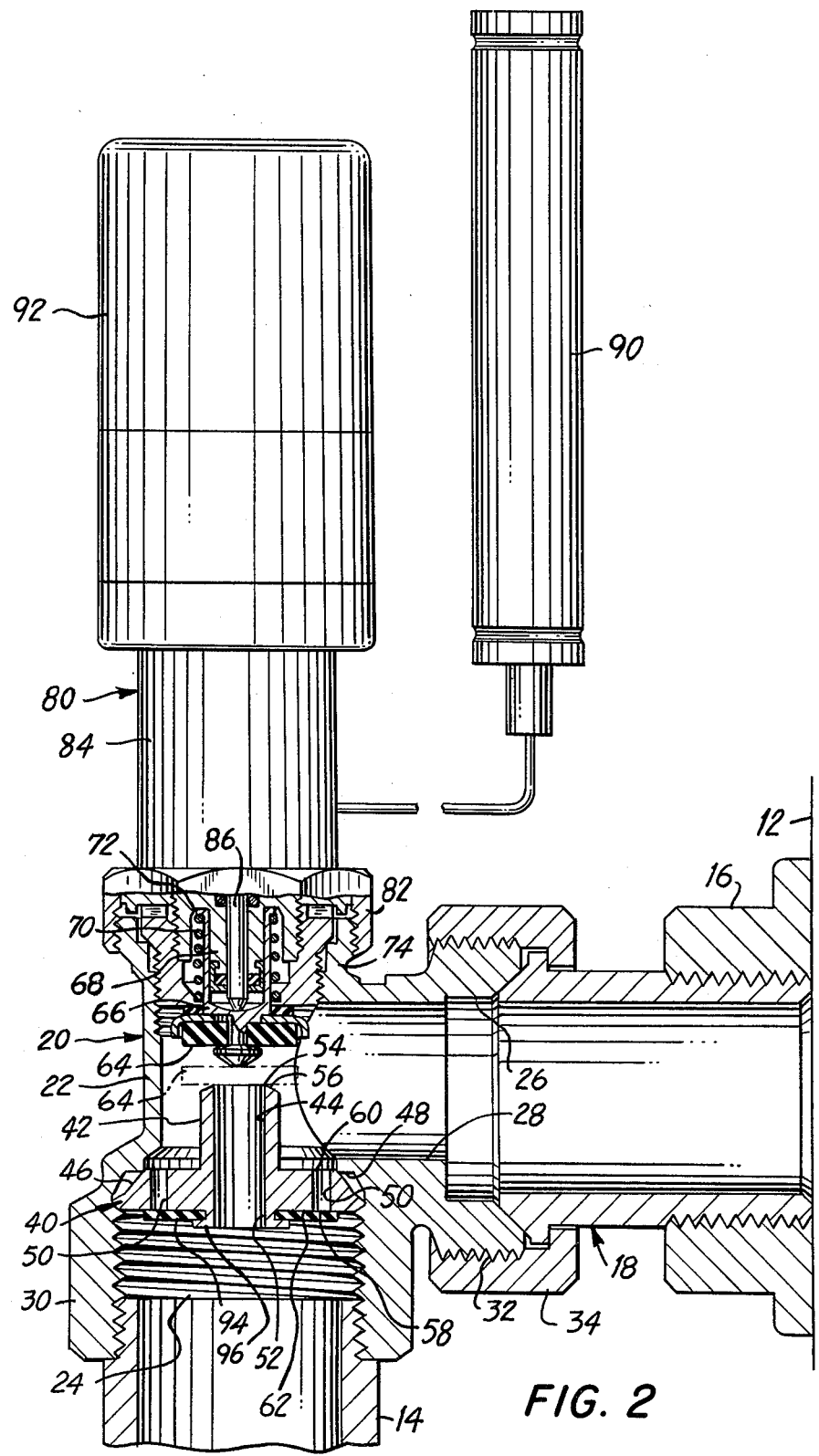
FIG. 2 is a partially cross-sectioned elevational view of the control valve.

Turning now to FIG. 2, control valve assembly 20 includes a valve body 22 having an inlet port 24, an outlet port 26 and a conduit 28 extending between the inlet and outlet ports 24 and 26. The valve body 22 is coupled to pipe 14 by means of an internally threaded sleeve 30 which is unitary with the valve body 22 at the inlet port 24. Likewise, the valve body 22 is coupled to radiator 12 by means of an externally threaded extension 32 at the outlet port 26, extension 32 being engaged by internally threaded collar 34 of fitting 18.

Located within the valve body 22 is a valve element 40 which has a generally tubular portion 42 extending axially upwardly and providing a central valve passage 44. A radially-extending flange portion 46 of the valve element 40 is threaded into sleeve 30 and is seated against a shoulder 48 to fix the valve element 40 within valve body 22. A plurality of apertures 50 are located in the flange portion 46 and extend axially therethrough, to provide a plurality of further valve passages arranged in a circular array around the central valve passage 44 and extending generally parallel to central valve passage 44. Central valve passage 44 extends between a lower end 52 and an upper end 54. A valve seat 56 is provided on the tubular portion 42 at the upper end 54 of central valve passage 44. Each of the apertures 50 extend between a lower end 58 and an upper end 60 and a valve seat 62 is provided along the lower surface of the flange portion 46, spaced axially from the valve seat 56. Each lower end 52 and 58 is located adjacent inlet port 24, while each upper end 54 and 60 is located adjacent outlet port 26.

A valve member 64 is located immediately above valve seat 56 and is carried by a cup-shaped carrier 66 which is mounted for axial sliding movement along an axial projection 68 affixed to valve body 22 in a manner which will be explained more fully below. Carrier 66 and valve member 64 are biased upwardly, into the position illustrated in full lines in FIG. 2, by a helical spring 70 which extends between a lip 72 on carrier 66 and a cap 74 which is threaded into valve body 22.

A thermostatically operated motor 80 is mounted to the valve body 22 at 82. Motor 80 has a housing 84 and axial projection 68 is integral with housing 84. A valve stem 86 is movable within axial projection 68, in upward and downward directions, in response to the operation of motor 80. The internal construction of motor 80 is known in the art of control valves and need not be illustrated in detail in the instant description. Suffice it to say that motor 80 is operated in response to variations in the temperature of the ambient atmosphere as sensed by a temperature sensor 90 placed within the space where temperature is to be controlled. The temperature response of motor 80 is selected by manually adjusting a knob 92 which is a part of the motor 80.

When, in accordance with the setting of knob 92 and the temperature sensed by sensor 90, it is necessary to supply heat to the ambient atmosphere, motor 80 will retract valve stem 86, to the position shown in FIG. 2, thereby opening central valve passage 44 and admitting steam from pipe 14 to radiator 12. Once radiator 12 has supplied sufficient heat to the ambient atmosphere, sensor 90 will sense the increase in temperature in the ambient atmosphere and motor 80 will be operated to move valve stem 86 downwardly, thereby moving carrier 66 downwardly against the bias of helical spring 70, until valve member 64 is seated against valve seat 56, as shown in phantom in FIG. 2, thereby closing central valve passage 44 and discontinuing the supply of steam to radiator 12.

It is noted that the passage of steam will be precluded from pipe 14 to radiator 12 through apertures 50 by virtue of a further valve members in the nature of a flap shown in the form of an annular member 94 of resilient material secured to the valve element 40 by means of an integral lip 96 and biased against valve seat 62 by virtue of the resilient nature of the material of annular member 94 and the pressure of steam in pipe 14. Thus, apertures 50 remain sealed by annular member 94.

Figure 3:
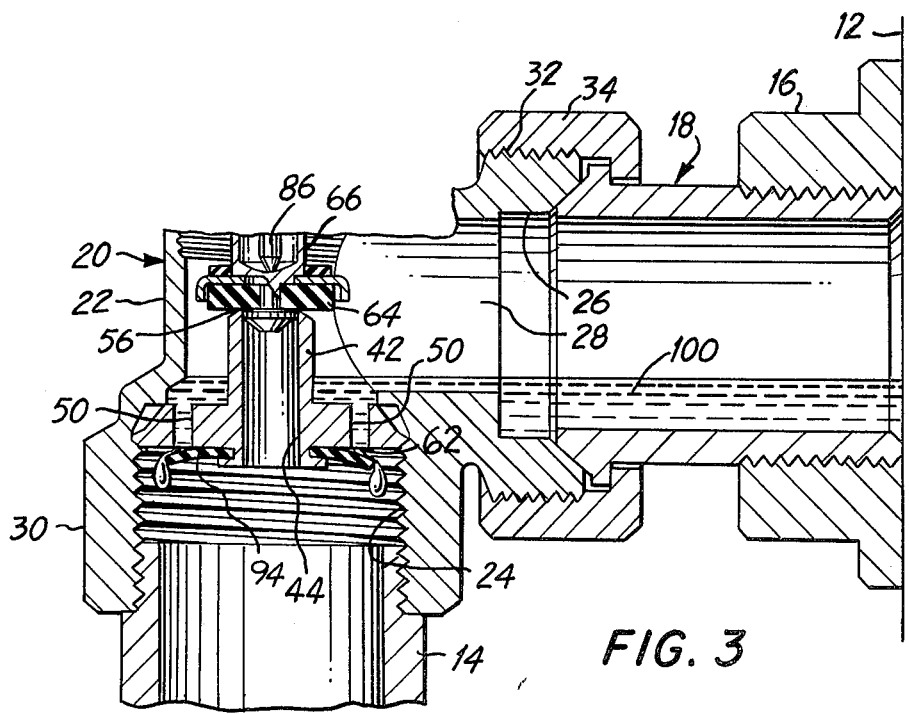
FIG. 3 is a fragmentary view of a portion of the control valve, similar to FIG. 2 but with certain component parts in another operating position.

Upon cooling of the steam and radiator 12, steam in the radiator 12 will condense. The one-pipe system requires that the condensate be returned through the same pipe 14 which supplied the steam. As seen in FIG. 3, condensate 100 is returned to pipe 14 through apertures 50 when the pressure at aperture 50, above the annular member 94, overcomes the upward bias of the annular member 94. Thus, the resilient nature of the material of annular member 94 will enable the displacement of annular member 94 downwardly, as shown, to allow return of the condensate. Any upward bias of annular member 94 as a result of steam pressure in pipe 14 also will be overcome by the combination of hydrostatic pressure of the condensate plus any steam pressure above the annular member 94.

The relatively simple and compact arrangement of control valve assembly 20 enables ready replacement of an ordinary standard steam valve in an existing installation. The simplified arrangement of control valve assembly 20 provides ease of operation and installation, as well as economical manufacture and reliable service.

It is to be understood that the above detailed description of an embodiment of the invention is provided by way of example only. Various details of design and construction may be modified without departing from the true spirit and scope of the invention as set forth in the appended claims.

The embodiments of the invention in which an exlusive property or privilege is claimed are defined as follows:

1. A control valve assembly for use in a one-pipe steam heating system in which incoming steam and outgoing condensate are carried to and from a radiator by a single pipe connected to the radiator through the valve assembly for supplying heat to the ambient atmosphere at the radiator, the valve assembly comprising:
   a valve body;
   first and second ports in the valve body;
   a conduit within the valve body, the conduit interconnecting the first and second ports;
   means for enabling connection of the first port to said single pipe;
   means for enabling connection of the second port to said radiator;
   a valve element affixed within the conduit between the first and second ports, the valve element including an axially-extending tubular portion and a radially-extending flange portion;
   a first valve passage located in the valve element and passing axially through the tubular portion thereof, the first valve passage interconnecting the first and second ports and including a first end adjacent the first port and a second end adjacent the second port;
   a first valve seat located at the second end of the first valve passage;
   a first valve member movable into and out of contact with the first valve seat to close and open the first valve passage;
   temperature-responsive means coupled to the first valve member for moving the first valve member in response to the temperature of the ambient atmosphere at the radiator for controlling the passage of incoming steam from the single pipe to the radiator;
   a second valve passage located in the valve element and passing axially through the flange portion thereof, the second valve passage interconnecting the first and second ports and including a first end adjacent the first port and a second end adjacent the second port;
   the second end of the first valve passage being spaced axially from the second end of the second valve passage by the tubular portion of the valve element such that the first valve seat is spaced axially away from the second end of the second valve passage to assure access to the second valve passage by the outgoing condensate when the first valve member is in contact with the first valve seat and to separate incoming steam at the second end of the first valve passage from condensate at the second end of the second valve passage when the first valve member is out of contact with the first valve seat;

a second valve seat located at the first end of the second valve passage; and a second valve member movable in response to pressure differences between the first and second ports into and out of contact with the second valve seat to close and open the second valve passage, the second valve member being movable into contact with the second valve seat in response to a higher pressure at the first port to preclude the passage of incoming steam through the second passage and being movable out of contact with the second valve seat in response to a higher pressure at the second end of the second valve passage to enable the passage of outgoing condensate from the radiator to the single pipe.

2. The invention of claim 1 wherein the second valve member comprises a flap of flexible material resiliently biased toward a position wherein the second valve passage is closed.

3. The invention of claim 1 wherein the second valve member is affixed to the valve element and is resiliently biased into contact with the second valve seat.

4. The invention of claim 3 wherein the second valve member comprises a flap of resiliently flexible material.

5. The invention of claim 1 wherein the second valve member comprises an annular member resiliently biased into contact with the flange portion to close the second valve passage.

6. The invention of claim 1 including a plurality of second valve passages extending through the flange portion essentially parallel to the first valve passage.

7. The invention of claim 6 wherein the second valve member comprises an annular member of resiliently flexible material affixed to the valve element so as to be resiliently biased into contact with the flange portion to close the second valve passages.

8. The invention of claim 7 wherein the temperature-responsive means includes a motor and the first valve member includes a valve stem coupled with the motor for movement in axial directions toward and away from the first valve seat.

* * * * *

UNITED STATES PATENT AND TRADEMARK OFFICE
CERTIFICATE OF CORRECTION

PATENT NO. : 4,412,648

DATED : November 1, 1983

INVENTOR(S) : Thomas H. Ford and Arend Sasserath

It is certified that error appears in the above—identified patent and that said Letters Patent is hereby corrected as shown below:

Column 1, line 53, "without" should read -- within --. Column 3, line 50, "members" should read -- member --; line 62, "aperture" should read -- apertures --.

Signed and Sealed this

Ninth Day of December, 1986

Attest:

DONALD J. QUIGG

Attesting Officer

Commissioner of Patents and Trademarks